3 Sheets—Sheet 1.

W. PEARCE.

Assignor, by mesne assignments, to L. J GUNN, Trustee.

DIE FOR FORGING OX-SHOES.

No. 10,831. Reissued Apr. 26, 1887.

WITNESSES.
Frank G. Parker,
Matthew M. Blunt.

INVENTOR.
William Pearce.
By his atty.
Brockholst S. Parker

N. PETERS, Photo-Lithographer, Washington, D. C.

W. PEARCE.

Assignor, by mesne assignments, to L. J GUNN, Trustee.

DIE FOR FORGING OX SHOES.

No. 10,831. Reissued Apr. 26, 1887.

WITNESSES.

Matthew M. Blunt
Frank G. Parker

INVENTOR.

William Pearce
by his atty,
Boardman S. Parker

N. PETERS, Photo-Lithographer, Washington, D. C.

W. PEARCE.

Assignor, by mesne assignments, to L. J GUNN, Trustee.

DIE FOR FORGING OX SHOES.

No. 10,831. Reissued Apr. 26, 1887.

WITNESSES.
Frank G. Parker.
Matthew M. Blunt.

INVENTOR.
William Pearce,
by his atty
Bowdoin S. Parker.

N. PETERS, Photo-Lithographer, Washington, D. C.

UNITED STATES PATENT OFFICE.

WILLIAM PEARCE, OF PLANTSVILLE, CONNECTICUT, ASSIGNOR, BY MESNE ASSIGNMENTS, TO LEVI J. GUNN, TRUSTEE, OF GREENFIELD, MASS.

DIE FOR FORGING OX-SHOES.

SPECIFICATION forming part of Reissued Letters Patent No. 10,831, dated April 26, 1887.

Original No. 314,189, dated March 17, 1885. Application for reissue filed March 19, 1887. Serial No. 231,598.

*To all whom it may concern:*

Be it known that I, WILLIAM PEARCE, of Plantsville, in the county of Hartford, and in the State of Connecticut, have invented certain new and useful Improvements in the Manufacture of Ox-Shoes; and I do hereby declare that the following is a full, clear, and exact description thereof, reference being had to the accompanying drawings, in which—

Figure 1:
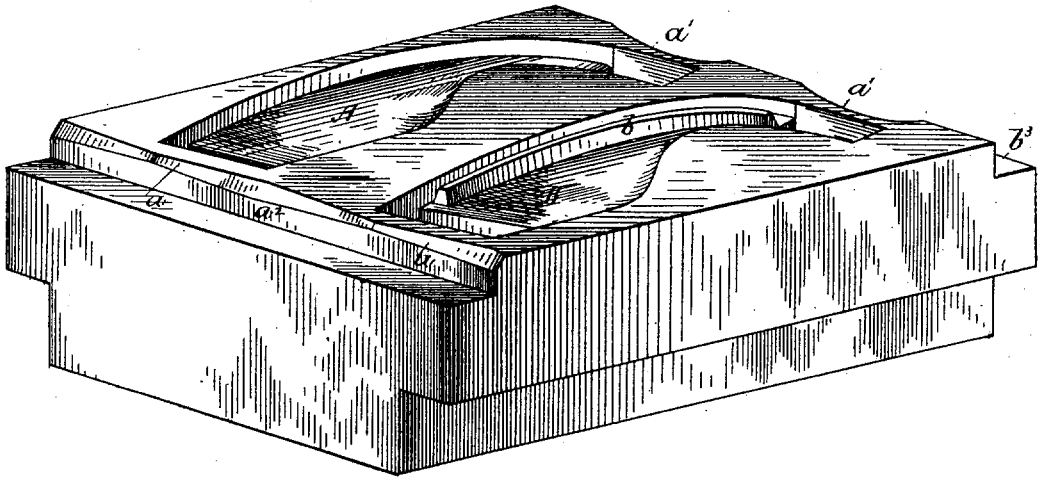
Figure 2:
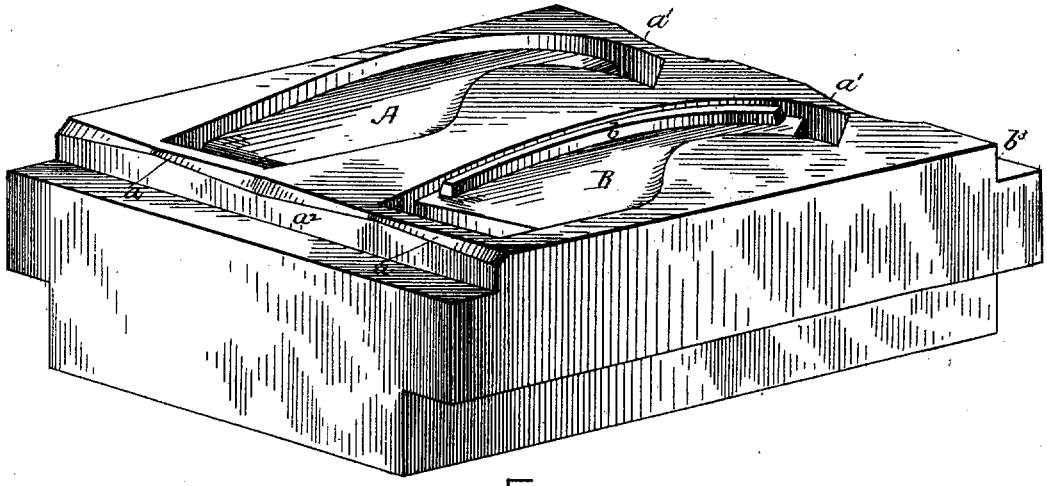
Figure 3:
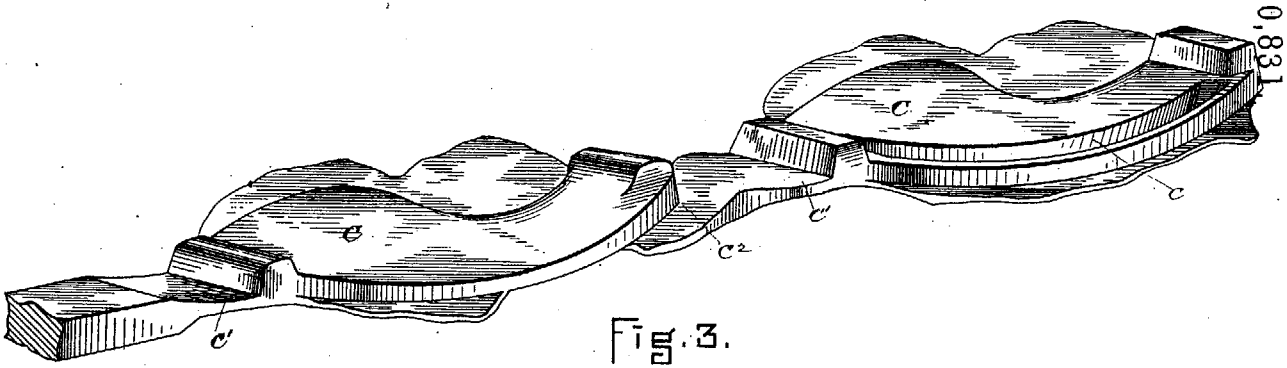
Figure 4:
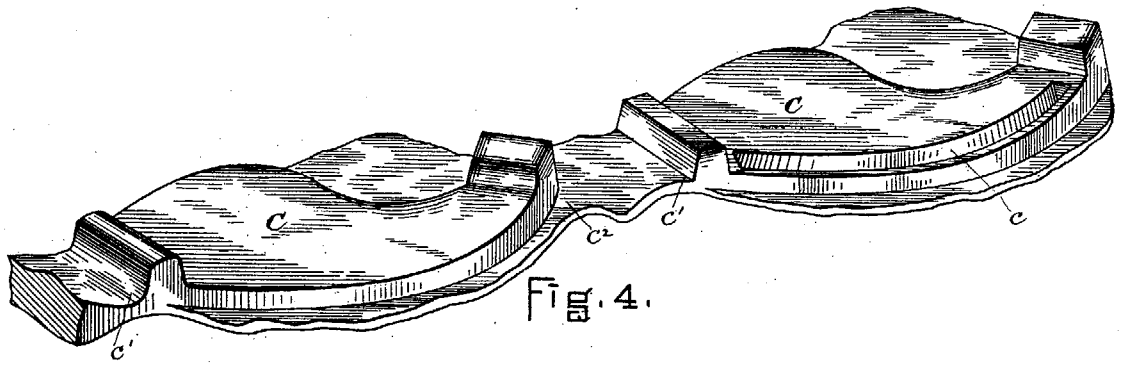
Figure 5:
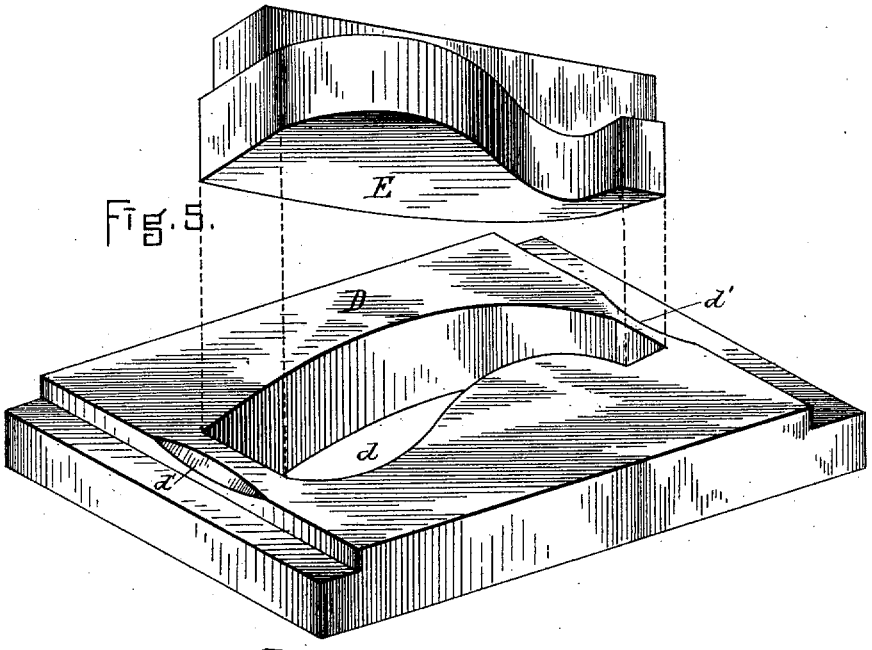
Figure 6:
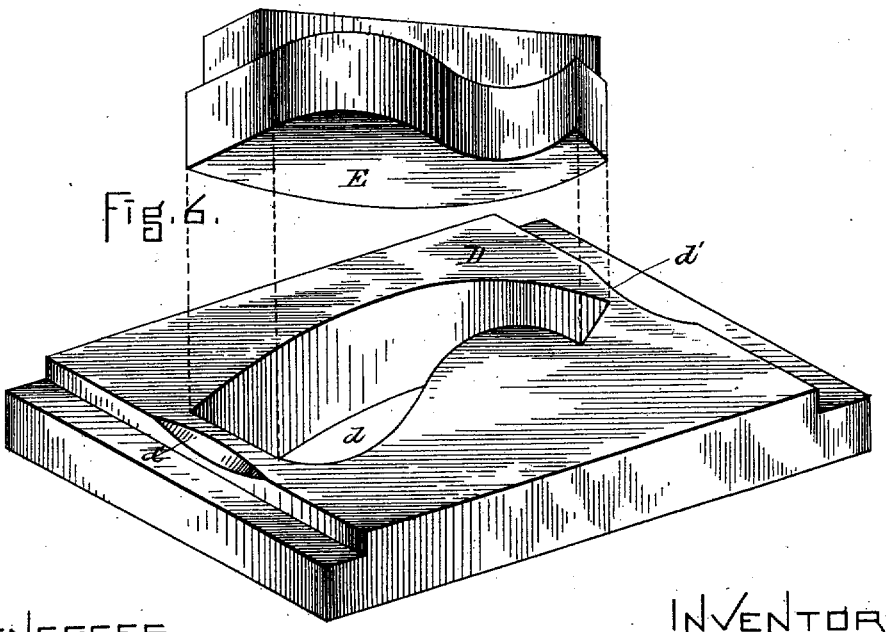

Figure 1 is a perspective view of the lower dies used for the forging of shoes. Fig. 2 is a like view of the same as arranged for forging the ordinary form of shoe. Fig. 3 is a perspective view of a blank and a completed shoe connected together and with the bar as left by the preliminary and finishing dies shown in Fig. 1. Fig. 4 is a like view of the same as left by the dies shown in Fig. 2, and Figs. 5 and 6 are respectively perspective views of the trimming-dies used in connection with the dies shown in Figs. 1 and 2.

Letters of like name and kind refer to like parts in each of the figures.

The design of my invention is to enable ox-shoes to be more easily, quickly, and cheaply produced by means of dies; to which end said invention consists, principally, in the construction of the dies, whereby a number of shoes may be forged at one heat from a bar, substantially as and for the purposes hereinafter shown.

It consists, further, in the series of dies used for forging a shoe, substantially as and for the purpose hereinafter set forth.

It consists, finally, in combining with the forging-dies, constructed substantially as shown, a trimming-die adapted to receive the sprue-connected blanks and to trim from each the surplus metal, substantially as and for the purpose hereinafter specified.

In the carrying into effect of my invention I make use of two forging-dies, A and B, which, for convenience, are formed within one block of metal and are arranged side by side, but may, if desired, be formed separately. The first of said dies, A, has the general size and shape of the desired shoe C, with contours of easily-flowing curves joined to the bottom of the sinkage by inclined warped surfaces, the contours and bottom free from abrupt changes, so as to permit the free flow of the plastic metal to all parts of the intaglio, substantially as represented in the drawings, Figs. 1 and 2. Said die A is without means for forming the nail-groove, while said second die, B, has the exact size and shape desired, and is provided with a Λ-shaped rib, *b*, which operates to produce the said nail-groove *c* in said shoe.

In practice a straight bar of iron is heated and placed over the die A in substantially a line with the transverse centers of the calk-recesses *a* and *a'*, in which position said bar is subjected to the action of a plain-faced upper die and caused to fill the cavities of said die A.

The partially-forged shoe C is now placed over the second die, B, and by means of said upper die is forced into the same and receives the exact shape required, including the nail-groove *c*.

In order that shoes may be forged directly from a bar, at each end of each die A and B is formed an outward and downward inclined face, $a^2$ and $b^3$, respectively, which operates to produce a Λ-shaped transverse notch, *c'*, at each end of the shoe C and nearly severs the metal at such point.

After the first shoe C has been partially completed by action of the die A, the heated bar is moved forward until the notch *c'* at its rear end fits over the correspondingly-shaped part that is formed by the calk-recess *a'* and the adjacent inclined face $a^2$, and thus operates as a gage and enables the longitudinal position of the bar to be easily and accurately determined. After shoe C has passed through the finishing-die B, it is placed over a female trimming-die, D, within which is an opening, *d*, that corresponds to the outline of the completed shoe, and is then operated upon by an upper male die, E, which forces said shoe through said opening and removes all surplus metal from its edges.

In order that the said shoe when connected with the bar may more readily find a bearing upon said lower trimming-die, the ends of the latter are provided with inclined faces *d'*, which correspond to the faces *a* and *b* of the dies A and B.

I am aware that before my invention ox-shoes have been made from blanks by the aid of a series of dies; but I am not aware that previous to my improvement ox-shoes have been made from a straight bar of stock by the aid of a series of dies, the first of which in the series has the characteristics of form shown at A, Figs. 1 and 2.

The process described is not claimed herein, as it forms the subject of a separate application for patent.

Having thus fully set forth the nature and merits of my invention, what I claim is—

1. The forging-dies described, each of which, beyond the end of its intaglio, has the metal cut away to form a downward and outward inclining face, *a* or *a'*, substantially as and for the purpose specified.

2. The dies A and B, constructed as described and adapted for forging an ox-shoe from a straight bar of metal, substantially as set forth.

3. The series of dies A, B, D, and E, constructed as described and adapted for forging and trimming an ox-shoe, substantially as shown.

In testimony that I claim the foregoing I have hereunto set my hand this 16th day of March, 1887.

WILLIAM PEARCE.

Witnesses:
WM. H. PEPWORTH,
R. W. WALKER.